United States Patent

Dailey

(10) Patent No.: US 8,356,532 B1
(45) Date of Patent: Jan. 22, 2013

(54) HYDRAULICALLY POWERED DOUBLE FLYWHEEL ALTERNATOR APPARATUS

(76) Inventor: Randall B. Dailey, Columbia, SC (US)

( * ) Notice: Subject to any disclaimer, the term of this patent is extended or adjusted under 35 U.S.C. 154(b) by 394 days.

(21) Appl. No.: 12/786,279

(22) Filed: May 24, 2010

Related U.S. Application Data

(60) Provisional application No. 61/180,921, filed on May 25, 2009.

(51) Int. Cl.
   *F16F 15/22* (2006.01)
(52) U.S. Cl. .................. 74/571.11; 290/1 C
(58) Field of Classification Search .................. 290/4 R
   See application file for complete search history.

(56) References Cited

U.S. PATENT DOCUMENTS

| | | | | |
|---|---|---|---|---|
| 2,117,018 A * | 5/1938 | Conrad et al. ............ 322/1 |
| 4,075,948 A | 2/1978 | Minovitch |
| 4,109,743 A * | 8/1978 | Brusaglino et al. ...... 180/65.245 |
| 4,218,624 A * | 8/1980 | Schiavone ............... 290/45 |
| 4,233,858 A * | 11/1980 | Rowlett ................... 475/5 |
| 4,309,620 A * | 1/1982 | Bock ...................... 290/4 R |
| 4,423,794 A | 1/1984 | Beck |
| 4,588,040 A | 5/1986 | Albright, Jr. et al. |
| 4,629,947 A * | 12/1986 | Hammerslag et al. ...... 318/161 |
| 4,768,607 A * | 9/1988 | Molina ................... 180/165 |
| 4,816,709 A * | 3/1989 | Weldon ................... 310/178 |
| 5,259,269 A * | 11/1993 | Swenson, Sr. ............ 74/571.11 |
| 6,236,127 B1 * | 5/2001 | Bornemann ............. 310/74 |
| 6,311,495 B1 * | 11/2001 | Shimizu et al. .......... 60/718 |
| 6,394,206 B1 * | 5/2002 | Fury ....................... 180/53.4 |
| 6,849,984 B2 | 2/2005 | Gallant |
| D548,696 S | 8/2007 | Pourkermani et al. |
| 2004/0262062 A1 | 12/2004 | Berbari |
| 2009/0036249 A1 * | 2/2009 | Savant et al. ........... 475/111 |

* cited by examiner

*Primary Examiner* — Joseph Waks

(57) ABSTRACT

The hydraulically powered double flywheel alternator apparatus is a KERS that provides for flywheel angular momentum, captured by the flywheels that are powered by an auto's driveline, to provide auxiliary charging to existing batteries of a hybrid or electric auto, thereby extending the auto's operating range under electricity.

2 Claims, 4 Drawing Sheets

HYDRAULICALLY POWERED DOUBLE FLYWHEEL ALTERNATOR APPARATUS

CROSS-REFERENCE TO RELATED APPLICATIONS

This Application Depends To Provisional App. No. 61/180,921 filed May 25, 2009

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Automobiles that run on electricity, whether in the form of pure electric drive or in a hybrid version that also includes a gasoline powered engine in various combinations with batteries, have potential for reducing the consumption of oil. The common problem however is the limited range of a car powered by batteries. Purely electric cars currently average a range of about 40 miles prior to recharging. And, too, recharging typically requires several hours and is conducted with electricity from the power grid, which translates into a large and perhaps unsustainable load on the power grid. The cost of electricity and the ongoing costs in time and money of running an electric car will likely hinder their acceptance and limit their numbers.

To circumvent such problems an apparatus is needed to continuously recharge an auto's battery or batteries, during auto operation, and thereby extend driving range. This can be an alternator continuously recharging the battery of a conventional gasoline engine through a KERS (kinetic energy recovery system).

The first step in analyzing a KERS solution is to profile typical driving scenarios. The first scenario that consumes the most gasoline with the least efficiency is city driving or multiple start stop driving. In this scenario, start up consumes a large amount of energy to get a typically 3000+ pound vehicle to go from 0 to 40 MPH or so. Once at speed, the energy required to maintain drops off. One problem is that maintaining speed usually only lasts for 2 to 5 minutes, or less, before the next stop occurs. That stop, a ii traffic signal for example, might last anywhere from 30 seconds to several minutes. With a gasoline engine, this stopped time continues to expend energy with the engine idling. For many, such driving might last from 15 minutes to about an hour and only cover 5 to 25 miles.

An electric automobile follows a similar profile in start and stop driving, with a few differences. An electric auto requires similar expenditures of energy in starting and maintaining speed. However, a major difference exists at a stop. In an electric car, there is no idling to consume energy.

Various types of KERS are known in the prior art. The present apparatus provides a unique KERS with a hydraulically powered double flywheel alternator apparatus including a first flywheel directly mounted to the alternator rotor shaft and a second flywheel further including a weight adjusting mechanism to increase the flywheel effect and to enhance momentum energy capturing capabilities. The second flywheel is also mounted to the alternator rotor shaft.

FIELD OF THE INVENTION

The present invention relates to vehicle power systems, and more particularly, to a hydraulically powered double flywheel alternator apparatus.

SUMMARY OF THE INVENTION

The general purpose of the present hydraulically powered double flywheel alternator apparatus, described subsequently in greater detail, is to provide a hydraulically powered double flywheel alternator which has many novel features that result in an hydraulically powered double flywheel alternator apparatus which is not anticipated, rendered obvious, suggested, or even implied by prior art, either alone or in combination thereof.

The present hydraulically powered double flywheel alternator apparatus provides a supplement that will extend an electric auto or hybrid vehicle's electrical operation range. In steady travel, after achieving a desired speed, that the alternator provides 60% to 80% recharge. This translates into the battery only draining 20% to 40% of capacity. The apparatus provides the very important feature of housing the alternator and hydraulic parts within an enclosure that is about 15 inches square. The apparatus offers the ability to go 2-5× times the distance of an electrically powered vehicle without the apparatus. Therefore, an electric or hybrid auto with a projected range of 40 miles may in fact be built to have a range of 80 to 200 miles. Thus, an auto with the present apparatus is more realistically competitive with internal combustion engine only autos.

A second concern is addressed by the apparatus. Whether through multiple apparatus applications to a vehicle or even using a single application, power required to run auto accessories is provided. Such accessories might include lights, instrument panel, radio, computer control systems, heater and A/C. This apparatus may use a standard issue 12 volt battery as commonly found in cars today or even battery banks found in electric and hybrid vehicles.

Any excess currents available from a second application may be separate from or joined to an initial apparatus.

The apparatus may be hydraulically driven by connection to a driveline or drivelines of an auto and may also be driven by a driveshaft, utilizing gears and hydraulic pumps and motors to power the alternator/flywheel combination. The apparatus may also use other devices for connecting the alternator to the driveline. Any of the connection devices used provide for selective communication whereby the alternator with flywheels is free to rotate with the vehicle in a halted state. When pulleys are used, each pulley driving the hydraulics of the apparatus may be connected to an auto's driveline by direct connection, another pulley, a belt, a chain, or any appropriate device for driving the apparatus. The continued operation, even during vehicle stop, can be likened to a spinning wheel cover seen on many cars these days. When the car stops the wheel covers continue to spin, having stored up the angular momentum gained during regular travel. The apparatus stores the energy in the spinning flywheels. The energy may be transferred to the flywheels via the hydraulics. Other transfer devices may be used, including gears, clutched gears, and other appropriate transfer mechanisms.

Thus has been broadly outlined the more important features of the present hydraulically powered double flywheel alternator so that the detailed description thereof that follows may be better understood and in order that the present contribution to the art may be better appreciated.

Numerous objects, features and advantages of the present outdoor cushion cover will be readily apparent to those of ordinary skill in the art upon reading the following detailed description of presently preferred, but nonetheless illustrative, examples of the present hydraulically powered double flywheel alternator when taken in conjunction with the accompanying drawings. In this respect, before explaining the current examples of the present hydraulically powered double flywheel alternator in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the hydraulically powered double flywheel alternator. It is therefore important that the claims be regarded as including such equivalent constructions insofar as they do not depart from the spirit and scope of the present invention.

Objects of the present hydraulically powered double flywheel alternator, along with various novel features that characterize the invention are particularly pointed out in the claims forming a part of this disclosure. For better understanding of the hydraulically powered double flywheel alternator, its operating advantages and specific objects attained by its uses, refer to the accompanying drawings and description.

DETAILED DESCRIPTION OF THE DRAWINGS

With reference now to the drawings, and in particular FIGS. 1 through 4 thereof, an example of the present hydraulically powered double flywheel alternator will be described.

Figure 2:
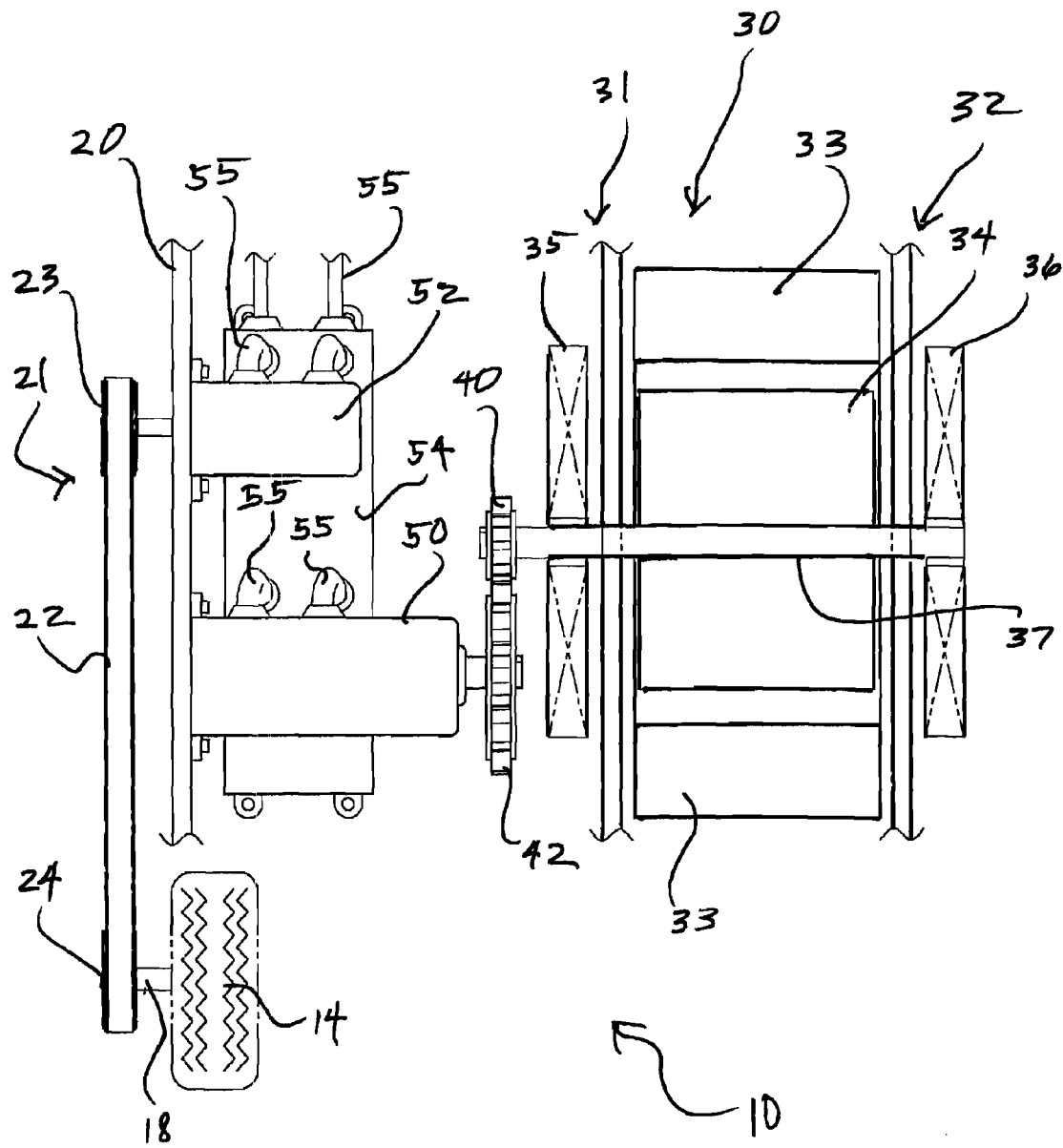
FIG. 2 is a top plan view.
Figure 3:
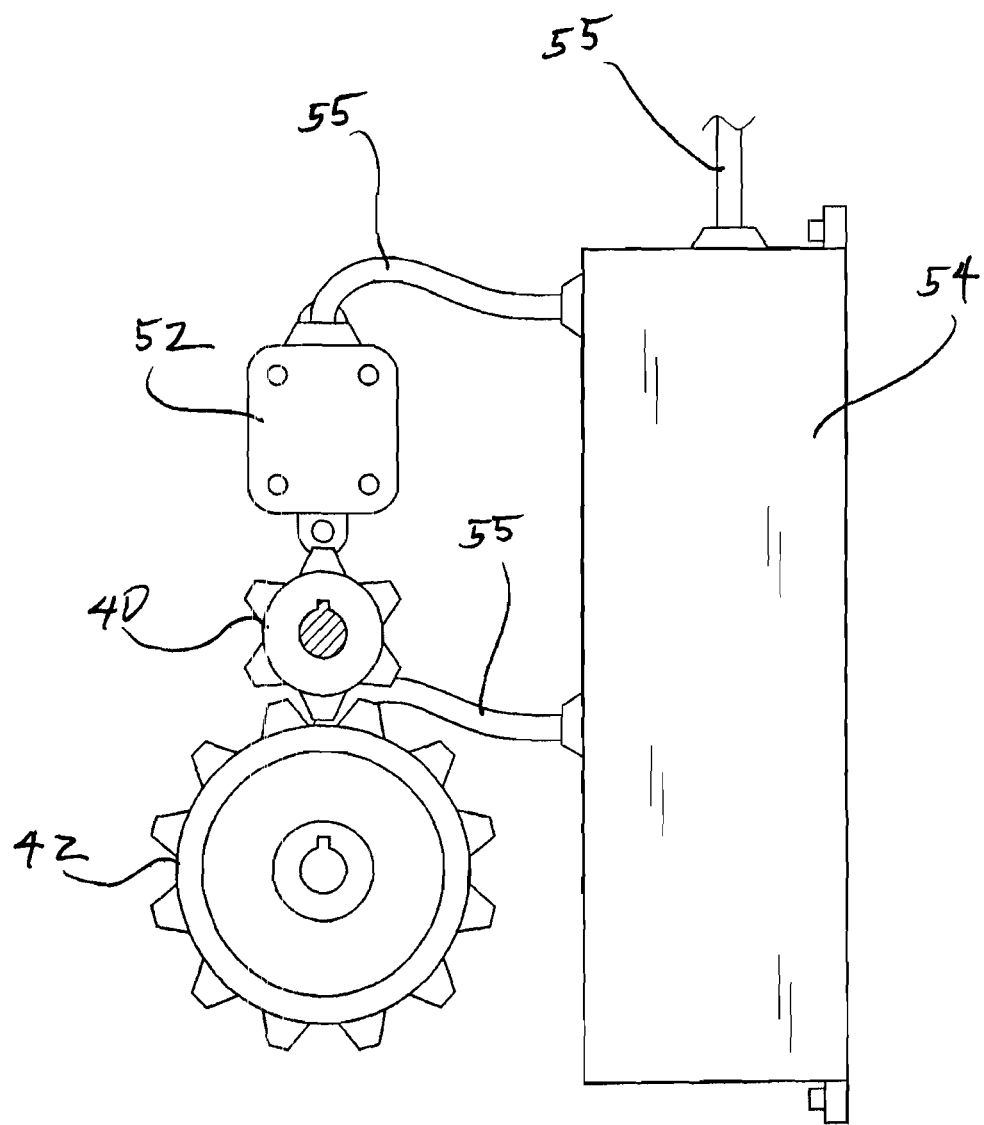
FIG. 3 is a lateral elevation view.
Figure 4:
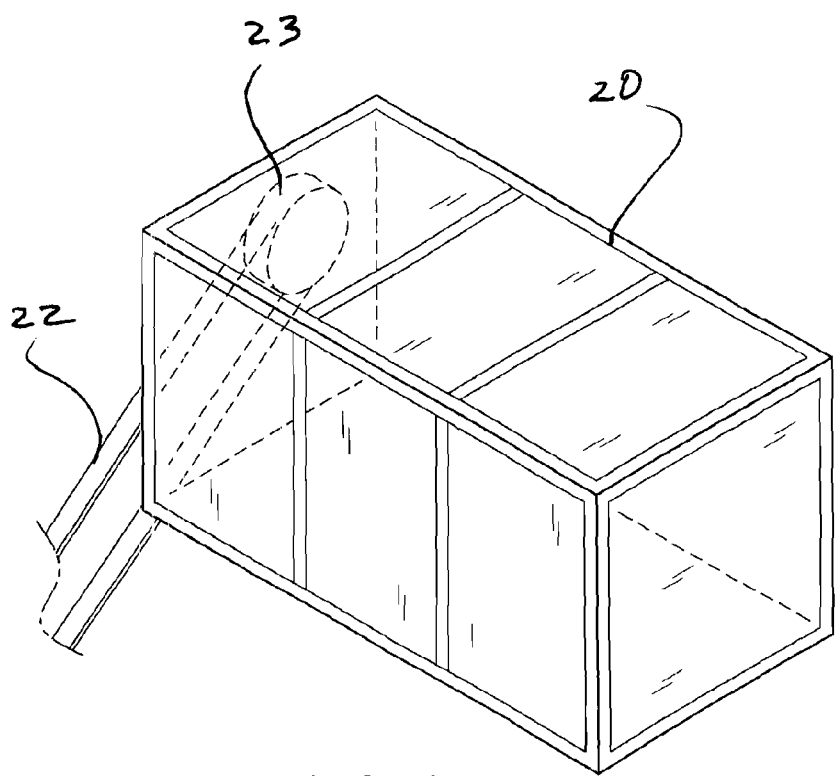
FIG. 4 is a perspective view of the enclosure.

Referring to FIG. 2, the apparatus 10 partially comprises the alternator 30 having a rotor 34 surrounded by a stator 33, a rotor shaft 37, and a first end 31 spaced apart from a second end 32. The first flywheel 35 is mounted externally to the alternator 30 first end 31 rotor shaft 37. The weight-adjustable second flywheel 36 is mounted externally to the alternator 30 second end 32 rotor shaft 37. The flywheels are driven forwardly by the shaft 37 during shaft 37 rotation, which coincides with auto driveline 18 movement. Typically, the driveline 18 is in communication with an existing drive wheel 14; however, the second pulley 24 may be in communication with any driveline 18 member of an auto that turns with the auto in motion. The alternator gear 40 is mounted to the rotor shaft 37 and laterally external to the first flywheel 35.

Figure 1:
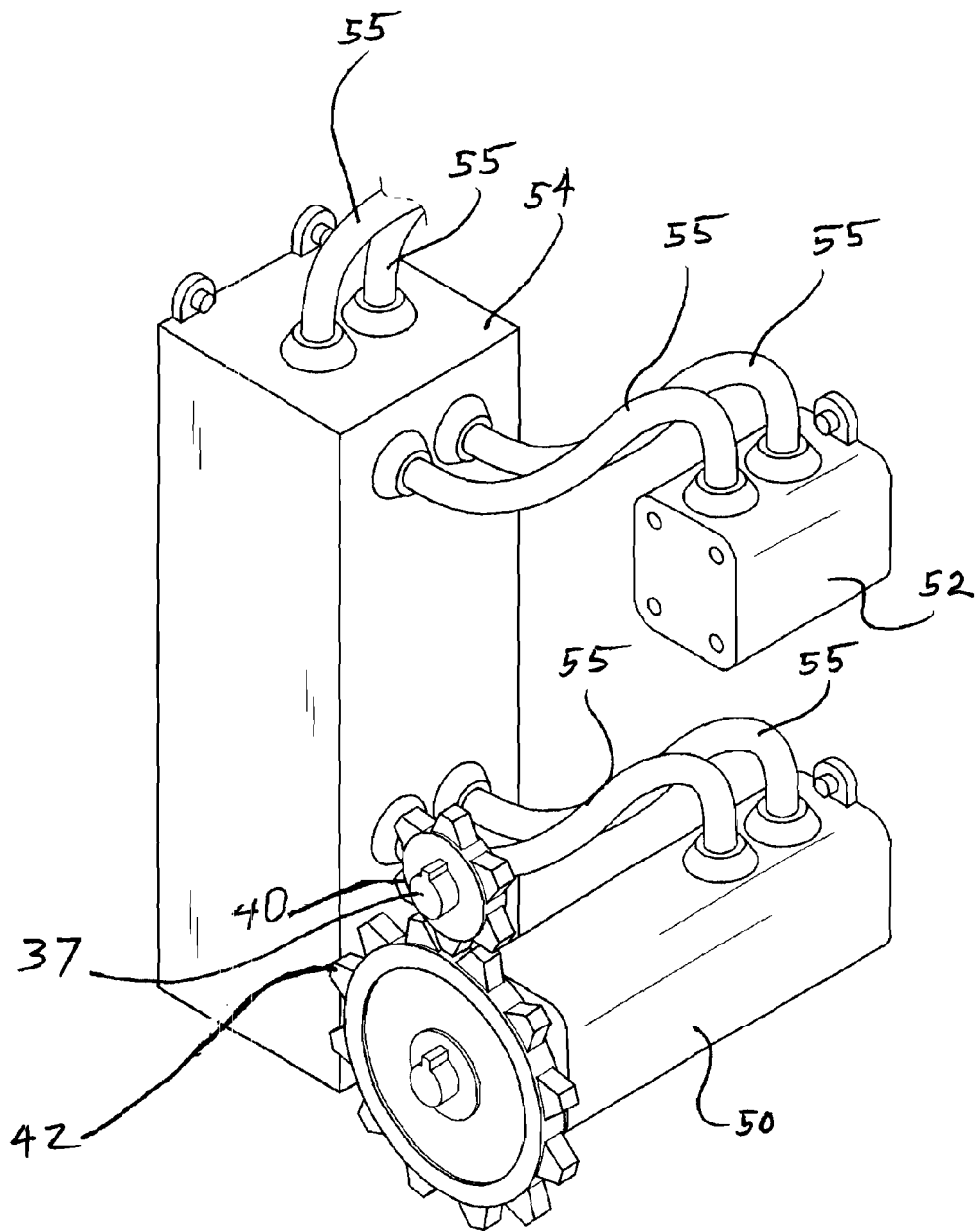
FIG. 1 is a perspective view of the hydraulic controls, pump and motor.

Referring to FIG. 1, the hydraulic motor 50 is in communication with the alternator gear 40 via the hydraulic gear 42. The plurality of encased control valves 54 is in communication with the hydraulic motor 50 via a pair of hydraulic hoses 55. A fluid reservoir (not shown) is in communication with the encased control valves 54 via a pair of hydraulic hoses 55. The reservoir can be supplied by any number of reservoirs known and readily available in the art. The hydraulic pump 52 is in selective communication with the encased control valves 54 via a pair of hydraulic hoses 55. The selectively communicating encased control valves 54 allow the rotor shaft 37 to continue to turn with the existing driveline 18 halted, until angular momentum is exhausted, thereby continuing to operate the alternator 30 and charge an existing electrical storage of an auto.

Referring to FIG. 4 and again to FIG. 2, the enclosure 20 houses the alternator 30 and flywheels, the gears, the hydraulic motor 50, the encased control valves 54, and the hydraulic pump 52. The enclosure 20 importantly measures about 15 inches square.

Referring to FIG. 3 and again to FIG. 2, the first pulley 23 is affixed to the hydraulic pump 52 and is external to the enclosure 20. The second pulley 24 is affixed to an existing rotating member, such as a driveline 18 connected to a drive wheel 14 of an existing automobile's driveline 18. The pulley connection 22 connects the first pulley 23 to the second pulley 24. The pulley connection 22, the first pulley 23, the second pulley 24 comprise the driveline connection 21.

With respect to the above description then, it is to be realized that the optimum dimensional relationships for the parts of the present outdoor cushion cover to include variations in size, fabrics, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A double flywheel alternator apparatus comprising, in combination:
   an alternator having a rotor surrounded by a stator, a rotor shaft affixed to the rotor, and a first end spaced apart from a second end;
   a first flywheel mounted externally to the alternator first end rotor shaft;
   a weight-adjustable second flywheel mounted externally to the alternator second end rotor shaft;
   an alternator gear mounted to the rotor shaft laterally external to the first flywheel;
   a hydraulic motor in communication with the alternator gear via a hydraulic gear;
   a plurality of encased control valves in selective communication with the hydraulic motor via a pair of hydraulic hoses;
   a fluid reservoir in communication with the encased control valves via a pair of hydraulic hoses;

a hydraulic pump in communication with the encased control valves via a pair of hydraulic hoses;

an enclosure housing the alternator and flywheels, the gears, the hydraulic motor, the encased control valves, and the hydraulic pump;

a first pulley affixed to the hydraulic pump and external to the enclosure;

a second pulley affixed to an existing rotating member of an existing automobile's driveline;

a pulley connection connecting the first pulley to the second pulley;

whereby the encased control valves allow the rotor shaft to continue to turn with the existing automobile driveline halted.

2. The apparatus according to claim 1 wherein the enclosure further comprises a dimension of about 15 inches square.

* * * * *